June 28, 1938.  S. L. CHRISTIE  2,122,363
CONCENTRATION TESTING APPARATUS AND METHOD
Filed July 2, 1935  2 Sheets-Sheet 1
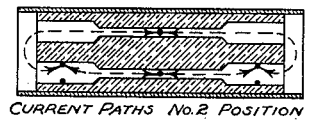
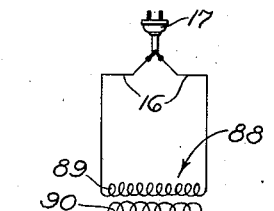
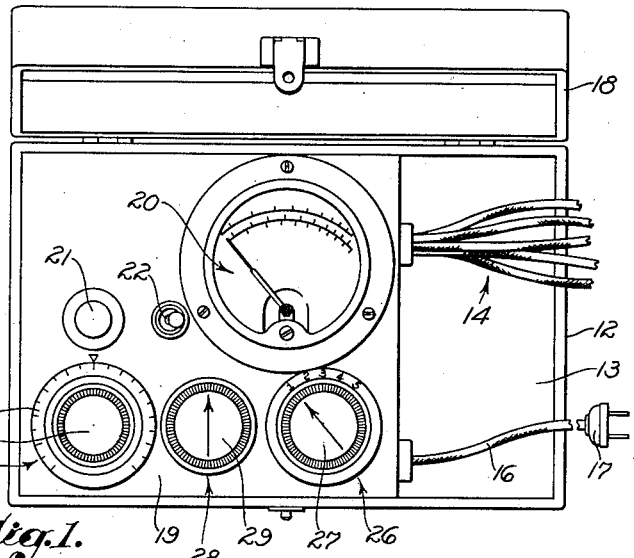
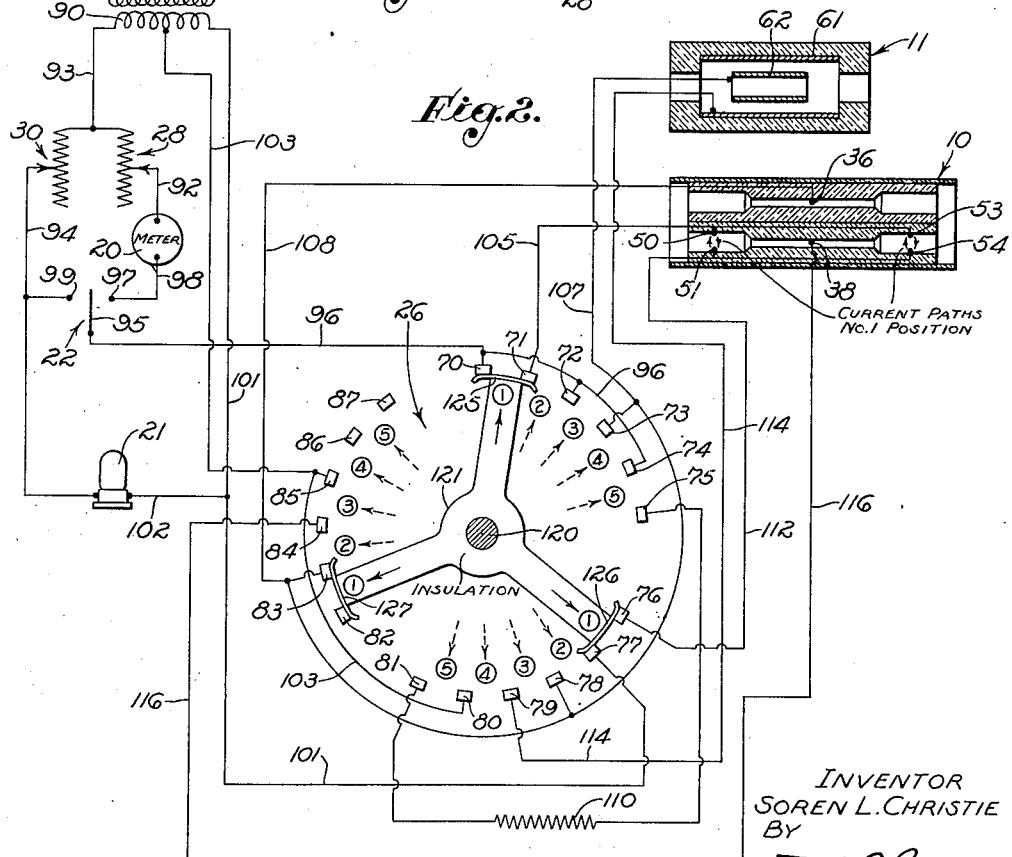
INVENTOR
SOREN L. CHRISTIE
BY
*Fred W. Lauier*
ATTORNEY.

June 28, 1938. S. L. CHRISTIE 2,122,363
CONCENTRATION TESTING APPARATUS AND METHOD
Filed July 2, 1935 2 Sheets-Sheet 2
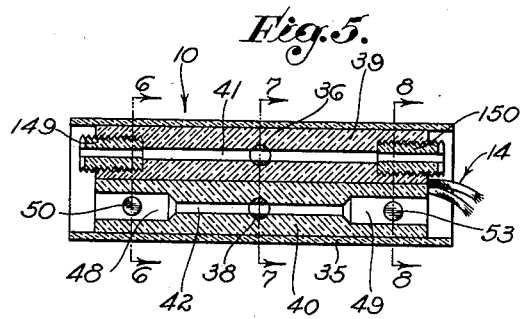
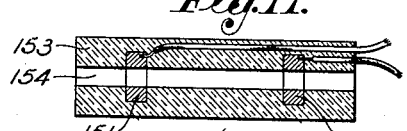
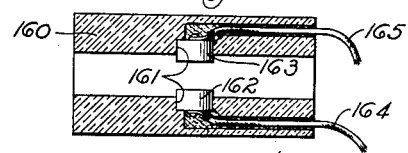
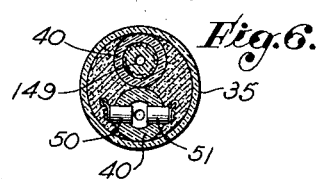
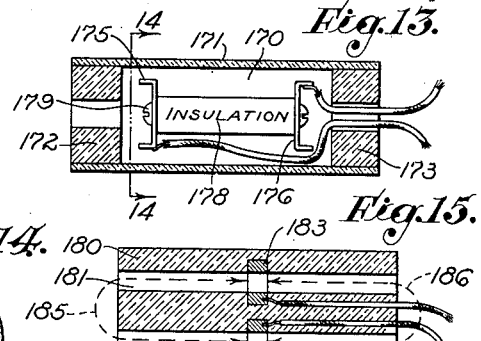
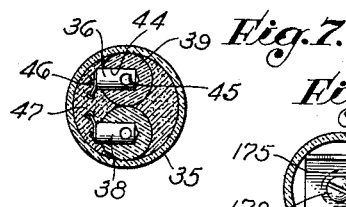
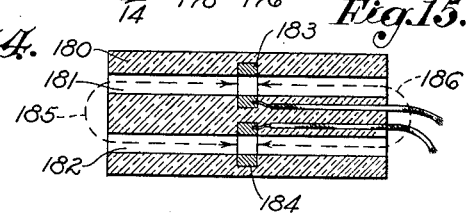
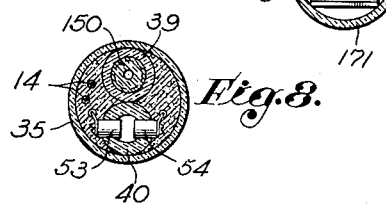
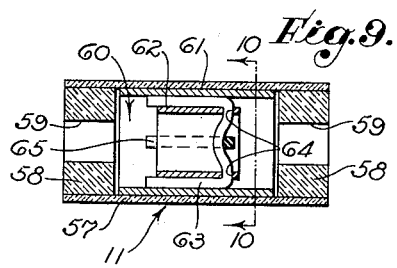
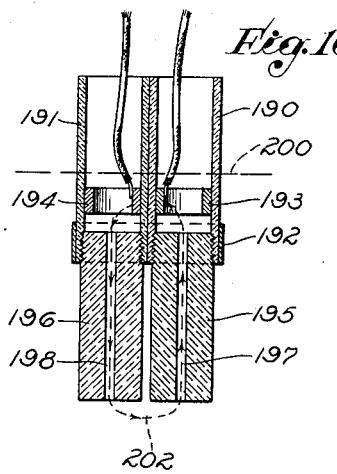
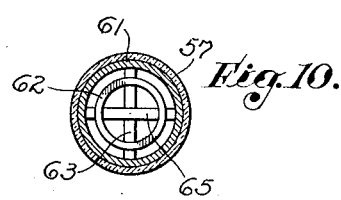
INVENTOR
SOREN L. CHRISTIE
BY
Ferd W Harris
ATTORNEY.

Patented June 28, 1938

2,122,363

UNITED STATES PATENT OFFICE 2,122,363

CONCENTRATION TESTING APPARATUS AND METHOD

Soren L. Christie, Los Angeles, Calif.

Application July 2, 1935, Serial No. 29,575

22 Claims. (Cl. 175—183)

My invention relates to a novel method and apparatus for measuring the electric conductivity of fluids, usually liquids though not invariably so, to indicate concentration of impurities or other substances therein, or to indicate the electric conductivity for any other purpose.

For instance, the invention can be used to indicate the salt contents in a stream or body of water, or can be used to indicate the presence of foreign matter in condensed steam, boiler waters, etc.

It is an object of the present invention to provide a novel system, usually of portable character, for measuring electric conductivity of fluids.

Up to the present time it has been customary in conductivity-testing instruments to provide electrodes mounted in fixed relation to a container in which the liquid to be tested is positioned, the mounting, and sometimes also the container, being part of the instrument. It is an important object of the present invention to provide an electrode cartridge housing and insulating the electrodes from each other, this cartridge being self-contained and partially or wholly immersible in the fluid to be tested and usually being independent of a fixed mounting.

Another object of the present invention is to provide a testing device including one or more electrode cartridges immersible in the fluid, with conductors extending from the one or more electrode cartridges to the balance of the testing equipment, these cartridges being successively or simultaneously immersible in the fluid.

A further object of the invention lies in the provision of a novel electrode cartridge providing one or more chambers having free access to the fluid, the electrodes contacting the fluid in such chambers.

It is a further object of the present invention to provide an electrode cartridge so formed as to prevent contact between the electrodes and any fluid-container into which the electrode cartridge is positioned. The shape and nature of the container do not materially affect the path of the electric current between the electrodes so that it is not necessary to furnish a special container with the device, the provision of such a system being included among the objects of the present invention.

In testing fluids of widely varying concentrations with a given indicating means it is often desirable to be able to change electrically or otherwise the condition tending to send current through the fluid. In the present invention the electrode cartridge employed may utilize a plurality of electrodes. With such a system the conditions tending to send current through the fluid may be varied by (1) changing the length of the current path through the fluid, (2) changing the cross-sectional area of the current path through the fluid, (3) changing the series-parallel connection of the electrodes to change the current paths through the fluid, (4) changing the voltage available for sending current through the fluid, (5) changing the number of current paths available for sending current through the fluid, or (6) changing several of these factors simultaneously.

One of the objects of the present invention is to provide a system which is capable of changing at least one of these factors, and, in one embodiment, to provide a system in which several of these factors are simultaneously changed to permit accurate indication of the electric conductivity of fluids of widely different conducting properties.

It is a further object of the invention to provide a system giving a visible indication as to electric conductivity or related phenomena. Thus, in the system to be hereinafter described, I have illustrated an indicating means in the form of a calibrated meter and also an indicating means in the form of a lamp or other signal which indicates when the electric conductivity or related phenomena exceeds or drops below a predetermined value, the provision of a system utilizing one or more indicating means being within the objects of the present invention.

It is a further object of the invention to provide a novel method of indicating electric conductivity of a fluid or related phenomena by use of a plurality of electrodes capable of being positioned therein.

Still further objects and advantages of the invention will be made evident to those skilled in the art from the following description.

Referring to the drawings:

Fig. 1 is a top view of my indicating system, the electrode cartridges not being shown.

Fig. 2 is a wiring diagram of one embodiment of the invention.

Figs. 3 and 4 are diagrammatic views illustrating the current paths through the fluid when the selector switch is in a second and third position respectively.

Fig. 5 is a sectional view of one of the electrode cartridges illustrated diagrammatically in Fig. 2.

Figs. 6, 7, and 8 are sectional views taken on corresponding lines of Fig. 5.

Fig. 9 is a cross-sectional view of the other electrode cartridge diagrammatically illustrated in Fig. 2.

Fig. 10 is a sectional view taken on the line 10—10 of Fig. 9.

Figs. 11, 12, and 13 illustrate alternative forms of electrode cartridges.

Fig. 14 is a sectional view taken on the line 14—14 of Fig. 13.

Figs. 15 and 16 are sectional views of other forms of electrode cartridge.

For purpose of illustration and without limiting myself thereto, I have chosen to specifically illustrate a form of the invention particularly applicable to testing of conductivity of liquids and which includes two electrode cartridges 10 and 11 alternatively or simultaneously immersible in the liquid to be tested. It should be clear, however, that a single electrode cartridge providing a plurality of electrodes may be used with complete success, regardless of whether this cartridge provides only two electrodes or a number of electrodes in excess of two, the term "plurality" as herein used indicating two or more elements.

I prefer to house my testing apparatus in a box 12 best illustrated in Fig. 1 and providing a compartment 13 at one end thereof adapted to receive the electrode cartridges 10 and 11 when not in use. This compartment is of sufficient size to also receive the various conductors, indicated in general by the numeral 14, which extend to these electrode cartridges, these conductors being covered with moisture-proof insulation so that they may extend beneath the surface of the liquids to be tested when the electrode cartridges are immersed therein. This compartment is also of sufficient size to receive a supply cable 16 connected to a plug 17 insertable into a conventional receptacle. A hinged cover 18 may be provided for closing the upper end of the box 12 when the device is not in use.

This box 12 retains a panel 19 shown as mounting two indicating means. The first means is shown as comprising a meter 20, usually a suitably calibrated milliammeter, and the second is shown as comprising a neon lamp 21 or other visual or luminous indicating means. A toggle switch 22 alternately connects these indicating means in circuit in a manner to be hereinafter described.

Also mounted on this panel 19 is a selector switch 26 controlled by a knob 27, the details of this switch being described hereinafter. The panel 19 also mounts a compensating means 28, to be hereinafter described, and controlled by a knob 29, as well as an indication control means 30 operated by a knob 31 associated with a dial 32.

The details of the main electrode cartridge 10 are best shown in Figs. 2, 5, 6, 7, and 8. In its essence, this electrode cartridge includes a plurality of electrodes suitably mounted on a support of insulating material and contacting the fluid to be tested. As shown, a shell 35, formed of tubular shape and preferably of insulating material, surrounds the electrodes in protecting relationship and prevents contact between these electrodes and the fluid-container in which the cartridge 10 is positioned. While any number of electrodes may be utilized, this embodiment illustrates six electrodes, two of these electrodes being indicated by the numerals 36 and 38.

I have found it desirable to utilize a baffle means associated with the cartridge 10 to lengthen the current path through the fluid between these or other of the electrodes or to control the cross-sectional area of the current path, or to serve both functions. Most conveniently this baffle means may take the form of one or more tubes, and the embodiment illustrated includes two tubes 39 and 40 formed of insulating material and retained side-by-side in the shell 35. It is desirable that the cartridge 10 provide a chamber communicating with the fluid at a plurality of points, and to so position the electrodes that they contact the fluid in this chamber. In the embodiment shown in Figs. 5 to 8, this chamber comprises one or both of the passages 41 and 42 extending through the tubes 39 and 40, these passages being open at their ends to communicate with each other and with the surrounding fluid to permit this fluid to freely circulate through the tubes.

The invention includes a simple means for retaining the electrodes 36 and 38 in position to contact the fluid in the passages 41 and 42. Referring particularly to Fig. 7, the tube 39 provides a bore 44 extending sidewise therein to communicate with the passage 41. This bore is of larger diameter than the passage 41 and is of such size that the electrode 36 is snugly retained therein. This electrode 36 is drilled either before or after insertion to form an opening 45 forming a continuation of the passage 41. By this construction the fluid in the passage 41 is in contact with a cylindrical electrode surface defined by the walls of the opening 45. A suitable conductor is connected to the electrode 36 by any suitable means such as a screw 46, this conductor extending from the shell 35 through a space 47 between this shell and the tubes 39 and 40. The space 47 between opposite ends of the tubes is preferably filled with insulating compounds to retain the tubes and the various conductors connected to the electrodes in place and to preclude entry of the fluid into this space 47.

The electrode 38 is of similar construction and extends sidewise into the passage 42.

In the embodiment shown the ends of the passage 42 are enlarged to provide spaces 48 and 49. As best shown in Fig. 6 opposed electrodes 50 and 51 are pressed into correspondingly opposed openings of the tube 40 so as to be bridged by the fluid in the space 48. Similarly, opposed electrodes 53 and 54, best shown in Fig. 8, are pressed into correspondingly opposed openings of the tube 40 to be bridged by the fluid in the space 49. Suitable conductor means are connected to the various electrodes and extend through the space 47 and from one end of the cartridge 10, these conductor means being indicated in general by the numeral 14 in Figs. 1 and 5. If desired, any or all of the electrodes may be molded into an enclosure of insulating compound formed of a single member or a plurality of members instead of employing the construction shown, using two insulating tubes inside an outer shell.

The construction of the auxiliary electrode cartridge 11 is best illustrated in Figs. 9 and 10. This cartridge provides two electrodes contacting the fluid in a chamber defined by the cartridge and communicating with the external fluid at a plurality of points. As disclosed, this cartridge includes a shell 57 formed of insulating material and preferably partially closed at opposite ends by plugs 58 providing openings 59 therein, these plugs being formed of rubber or other insulating material. A chamber 60 is thus formed in the cartridge 11 and freely communicates with the external fluid through the openings 59. Positioned in this chamber is an outer electrode 61 of sleeve form, this electrode being concentric with an inner electrode 62 also of sleeve form. Various means may be utilized for retaining the inner electrodes in central position. In the embodiment shown a strip of rubber 63 extends through opposed openings 64 at one end of the inner electrode 62 and extends longitudinally along the periphery of this inner electrode, being of such size as to bridge the space between the inner and outer electrodes. A similar strip of rubber 65 extends through another pair of oppositely disposed openings in the inner electrode 62, crossing the strip of rubber 63, the end portions of the strip 65 also extending longitudinally in the space between the inner and outer electrodes. This mounting means is very simple and effective, though other means may be utilized. It is not necessary to retain the inner electrode 62 in exact centered position, for while eccentric positioning will shorten the current path on one side of the inner electrode, it will correspondingly lengthen the current path on the opposite side of this inner electrode.

In using a plurality of cartridges each provided with two electrodes, it is possible to connect the pairs of electrodes in parallel across a source of potential and provide a suitable indicating means responsive to the current flowing to the electrodes, the cartridges being alternatively immersible in the fluid. However, the system shown is particularly applicable to testing fluids of widely varying conductivities and in such a system it is desirable to connect the electrodes in different sequence to a potential source, and, in some instances, to a multi-potential source, utilizing an indicating means responsive to the current flowing to or from the electrodes to give an indication as to the conductivity or related phenomena. While it is possible to utilize a single set of electrodes in testing fluids of widely varying concentration or conductivity by use of shunts for the meter, this introduces undesirable variation in scale. It is desirable that the resistance of the meter circuit be low relative to the resistance of the fluid bridging the electrodes at any particular time, thus making it desirable to change the resistance of the fluid bridging the electrodes so as to keep this resistance high relative to the meter resistance.

These results may best be accomplished by use of a switch means of the selector type, one form being diagrammatically illustrated in Fig. 2 by the numeral 26. As diagrammatically shown, this selector switch 26 includes three groups of contacts equally spaced around a circle. The contacts of the first group are numbered 70 to 75 inclusive, the second group 76 to 81 inclusive, and the third group 82 to 87 inclusive.

One method of connecting the various elements is best shown in Fig. 2. Here a multi-potential source is indicated by the numeral 88. While a self-contained potential source may be utilized in conjunction with the box 12, I prefer to utilize a transformer providing a primary winding 89 connected to a suitable alternating-current line through the cable 16 and the plug 17. This transformer is shown as having a tapped secondary winding 90. By way of example and without limiting myself thereto, satisfactory results can be obtained by so designing the transformer that the potential across the secondary winding is approximately eighty volts, while the potential from the left-hand terminal of this winding to the tap is approximately forty-nine volts.

The compensating means 28 may comprise any variable impedance, the form illustrated in Fig. 2 showing this compensating means in the form of a variable resistance with the sliding contact connected to the meter 20 through a conductor 92 and with one end of the resistance unit connected to the left-hand terminal of the secondary 90 through a conductor 93.

Similarly, the indication control means 30 may comprise any variable impedance means, being illustrated as comprising a variable resistance with one terminal connected to the conductor 93 and with the sliding contact connected through a conductor 94 to one terminal of the lamp 21.

The switch 22 is preferably of the toggle type and includes an arm 95 connected to the contacts 70, 72, and 74 by a conductor 96. When this arm is in a right-hand position it engages a contact 97 connected to the remaining terminal of the meter 20 through a conductor 98 to throw the meter 20 into circuit. When the arm 95 is in a left-hand position it engages a contact 99 connected to the conductor 94 to throw the indication control means 30 into circuit.

The right-hand or higher-voltage terminal of the secondary winding 90 is connected by a conductor 101 to the contact 71, the remaining terminal of the lamp 21 being connected by a conductor 102 to the conductor 101. The intermediate or low-voltage tap of the secondary winding 90 is connected by a conductor 103 to the contacts 85 and 80.

The contact 71 of the selector switch is connected to the electrodes 50 and 53 through a conductor 105. Similarly, the contacts 73, 78, and 83 are electrically connected together and are connected through a conductor 107 to the inner electrode 62 of the cartridge 11 and are connected through a conductor 108 to the electrode 36 of the cartridge 10.

A calibrating means of fixed impedance is connected between the contacts 75 and 81 and is shown as a resistor 110. It will be clear, however, that other impedance means may be utilized in this connection.

The contact 76 of the selector switch 26 is connected by a conductor 112 to the electrodes 51 and 54 of the cartridge 10. Similarly, the contact 79 is connected by a conductor 114 to the outer electrode 61 of the cartridge 11, and the contact 84 is connected by a conductor 116 to the electrode 38 of the cartridge 10. The contacts 82, 86, and 87 are not utilized in this form of the invention.

The selector switch 26 includes a shaft 120 operatively connected to the knob 27 and secured to a hub 121 formed of insulating material and providing three outward extending arms spaced equidistant from each other, one arm being utilized for each group of contacts. Bars 125, 126, and 127 are respectively mounted on the outer ends of these arms, each of these bars being of such length as to bridge across the contacts of an adjacent pair. The selector switch may assume any one of five positions, appropriately indicated by the encircled numerals 1 to 5 of Fig. 2. For instance, when the selector switch is in position No. 1 (as shown in Fig. 2) the bar 125 bridges the contacts 70 and 71, the bar 126 bridges the contacts 76 and 77, and the bar 127 bridges the contacts 82 and 83. When the selector switch is moved into its position No. 2, the bar 125 bridges the contacts 71 and 72, bar 126 bridges the contacts 77 and 78, and the bar 127 bridges the contacts 83 and 84. Other bridging sequences will be apparent from Fig. 2 and from the following description of the operation of the system.

In the operation of this system the plug 17 is inserted into a suitable receptacle and the cartridges 10 and 11 or either of them are lowered into the fluid to be tested, either into a stream of the fluid or into a body thereof retained in a suitable receptacle, the conductor means 14 suspending the one or more cartridges in the fluid or the cartridges resting against a portion of the walls confining the fluid.

It is usually desirable to calibrate the instrument preliminary to accurate testing. Position No. 5 of the selector switch is the calibrating position, and the toggle switch 22 is thrown to the right to connect the meter 20 in circuit. At this time current will flow in series circuit from the secondary winding 90 through the conductor 93, the compensating means 28, the meter 20, the toggle switch 22, and through the conductor 96 to the contact 74, thence flowing through the bar 125 to the contact 75, and through the calibrating resistor 110 to the contact 81, the current returning to the lower-voltage tap of the transformer winding 80 by flowing through the bar 126, the contact 80, and the conductor 103. The instrument is preliminarily calibrated at the factory so that the hand of the meter 20 will assume a given position with a given voltage applied to this circuit. If the reading of the meter 20 does not correspond to this preliminarily determined reading, the operator adjusts the compensating means 28 until the predetermined reading is indicated. It will be clear that the compensating means 28 compensates for differences in line voltage, and, in the embodiment shown, inserts more or less resistance into the circuit to vary the reading of the meter. It also compensates for other factors such as frequency, or for variations in the instrument itself. Other types of compensating means may be utilized and may operate in somewhat different manner to compensate for variation in line voltage.

After the system has been calibrated, the selector switch 26 is moved into position No. 4 if the auxiliary cartridge 11 has been immersed, otherwise the switch is moved to position No. 3. With the selector switch in position No. 4, current flows from the secondary winding of the transformer through the compensating means 28, the meter 20, the toggle switch 22, and the conductor 96, flowing through the contact 74 and the bar 125 to the contact 73 and flowing to the electrode 62 through the conductor 107, the current flowing through a relatively short current path to the outer electrode 61 and returning to the low-voltage tap of the secondary winding through the conductor 114, the contact 79, the bar 126, the contact 80 and conductor 103. In this position a low voltage is impressed across the electrodes 61 and 62 and the hand of the meter will move a distance determined by the current flowing through these electrodes. Four scales are provided on the meter 20 respectively corresponding to positions Nos. 1 to 4 of the selector switch, and the operator can ascertain by reference to the scale corresponding to position No. 4 the concentration in parts per million (or other units), or the conductivity or other property for which this scale is calibrated.

Should the meter read off scale, or if the cartridge 11 has not been immersed, the operator moves the selector switch to position No. 3. At this time current flows from the secondary winding through the compensating means 28, the meter 20, the toggle switch 22, the conductor 96, the contacts 72 and 73 through the bar 125, flowing to the electrode 36 through the conductor 108. The current then traverses a relatively long path between the electrodes 36 and 38. If the ends of each tube are open, the current will flow in parallel paths between these electrodes as indicated in Fig. 4, returning to the low-voltage tap of the secondary winding through the conductor 116, the contact 84, the bar 127, the contact 85, and the conductor 103. At this time a low potential will be impressed between the electrodes 36 and 38 and the current will flow in parallel paths therebetween as indicated in Fig. 4. By reference to the meter scale corresponding to position No. 3 of the selector switch, the operator can ascertain the concentration or other phenomena to be indicated.

In the event that the hand of the meter 20 deflects only slightly and thus fails to give a reading of the desired accuracy, the operator turns the selector switch to position No. 2. At this time current flows from the transformer through the meter and switch as previously described, flowing through the conductor 96, the contact 72, the bar 125, the contact 71, and through the conductor 105 to the electrodes 50 and 53. The current here divides to flow through paths as indicated in Fig. 3. Thus, one portion of the current flows through parallel paths from the electrodes 50 and 53 to the electrode 36, returning to the higher-voltage terminal of the transformer through conductor 108, contact 78, bar 126, contact 77, and conductor 101. Another portion of the current may flow from the electrodes 50 and 53 to the electrode 38 in two parallel paths, returning to the higher-voltage terminal of the transformer through conductor 116, contact 84, bar 127, contact 83, contact 78, bar 126, contact 77, and conductor 101. It will thus be clear that when the selector switch is in position No. 2, there are four current paths through the fluid to be tested, thus tending to increase the current and the reading of the meter 20. In addition, a higher voltage is applied thus tending further to increase the reading of the meter.

In the event that the hand of the meter still remains in the lower range, thus precluding the corresponding meter from accurately indicating the concentration or other phenomena, the operator turns the selector switch into position No. 1. Current then flows from the transformer through the compensating device 28, the meter 20, the toggle switch 22, the conductor 96, the contact 70, the bar 125, the contact 71, and through the conductor 105 to the electrodes 50 and 53. When in this position two parallel current paths are formed from the electrodes 50 and 53 to the electrodes 51 and 54, these current paths being relatively short. The current flows from the electrodes 51 and 54 through the conductor 112, the contact 76, the bar 126, the contact 77, returning to the high-voltage terminal of the transformer through the conductor 101. Thus, when the selector switch is in this position a relatively high potential is impressed across two relatively short paths through the fluid as indicated in Fig. 2, thus tending to further increase the current through the meter 20 to give a reading on the intended portion of the meter scale corresponding to position No. 1 of the selector switch to give an indication of concentration or other phenomena.

It will be clear that the current flowing through the meter will be determined by one or more of the following variables in my system: (1) the length of the current path through the fluid, paths of greater length having greater resistance; (2) the cross-sectional area of the current path, paths of smaller cross-sectional area having larger electrical resistance; (3) the series-parallel connection of the electrodes, the parallel connection permitting increased flow of current; (4) the voltage applied to the electrodes, higher voltages producing larger currents; and (5) the number of available current paths, a larger number increasing the current flowing through the meter. My invention comprehends a change in one or more of these factors to permit accurate testing with a single system of liquids of widely varying conductivity.

For instance, the length of the current path can be changed either electrically or mechanically. Thus, the selector switch when in position No. 1 determines a relatively short path, and when turned to position No. 2 or No. 3 it determines a longer path. So also, when in position No. 4 a short path is determined through the cartridge 11, but this selector switch provides a means for electrically determining a longer path when moved into position No. 3, a longer path being thus formed in the cartridge and being placed in circuit with the meter.

Mechanically, the length of the available current path may be changed by changing the effective baffle lengths. For instance, in the form of the invention shown in Fig. 5, plugs of insulating material 149 and 150 with passages therethrough may be screwed into the tube 39 to increase the effective length of the current paths if desired. Such plugs thus act as a baffle means to increase the length of the current path, and plugs of various lengths may be supplied with the testing equipment. Plugs of different lengths are also utilized in the form of the invention shown in Fig. 14 to be hereinafter described.

As to the factor of cross-sectional area of the current path, this may be changed either electrically or mechanically. This factor may be electrically changed by selectively connecting certain of the electrodes in such relation that paths of different cross-sectional area are traversed. This may conveniently be done by use of the selector switch. For instance, when this selector switch is in position No. 1, a large cross-sectional area is available for the current due to the fact that the electrodes 50 and 51 are relatively extensive in area and due to the fact that the current path therebetween is not confined by walls, thus permitting a certain amount of spreading the current as it flows between these electrodes. On the other hand, when the selector switch is in position No. 2, a smaller cross-sectional area is available, the path being confined by the passage 41 or 42. It is also possible to make the passages 41 and 42 of different diameter to change the cross-sectional area available for the current flow.

Mechanically, the cross-sectional area can be changed by inserting plugs 149 and 150 having openings of a diameter unequal to the diameter of the passage 41.

The factor relating to the series-parallel connection of the electrodes can be changed electrically. Thus, when the selector switch is in position No. 3, the electrodes 36 and 38 are connected in series across the potential source. However, when this selector switch is moved into position No. 2, the electrodes 36 and 38 are connected in parallel with electrodes 50 and 53.

As to the factor of voltage applied to the electrode, this can be changed by use of the selector switch. For instance, when the selector switch is in position No. 3, a low voltage is applied, the available voltage being increased when the selector switch is moved into position No. 2.

As to the factor involving the number of paths, this may be changed either electrically or mechanically. The selector switch serves to electrically change the number of paths in the embodiment shown. For instance, when this selector switch is in position No. 4, only one path is available. When in position No. 3, two paths are available, and when in position No. 2, four paths are available. Mechanically, this factor may be changed by blocking off certain of the current paths as by inserting one or more of the plugs 149 or 150 providing no openings therein.

In the embodiment illustrated, certain of these factors may be simultaneously changed, but it should be clear that this is not essential to the invention. A change in any of the above factors, either in itself or in conjunction with other factors, is comprehended within the objects of the present invention.

It should not be understood that I am limited to the use of two tubes 39 and 40 to mount the various electrodes. If desired, a single tube may be utilized, the electrodes being disposed therein at different spacings or connected by current paths of different cross-sectional area, or both, one such embodiment being shown in Fig. 11 to be hereinafter described. The form illustrated in Figs. 5 to 8 is, however, very compact.

Further, if desired, a plurality of cartridges may be used, each containing two electrodes, each pair of electrodes being connected to the source of potential and the indicating means to eliminate the selector switch. If this embodiment is used the indicating means may be provided with a plurality of scales one for each cartridge, the cartridges being separately immersed.

It is often desirable to warn the operator of a condition involving a concentration or conductivity which is above or below a predetermined value. Thus in a concentration-control system, it is often desirable to indicate to the operator an increase in the concentration above a predetermined value. In my system this may be accomplished by throwing the toggle switch 22 to the left, thus eliminating the meter 20 from the circuit and transferring the energizing current from the compensating means 28 to the indication control means 30. Regardless of the position of the selector switch, the current flowing to the electrodes will develop a voltage drop in the variable resistance comprising the indication control means 30. When no current flows to the electrodes the full voltage of the secondary winding 90 will be impressed across the neon lamp 21 causing illumination thereof. However, as the current to the electrode increases, the voltage available for illuminating this neon lamp decreases, and when insufficient voltage is applied to maintain illumination, this lamp will become darkened, thus indicating to the operator that the concentration is too high. Thus, by suitably adjusting the indication control means 30, the neon lamp will cease to be illuminated at any desired concentration.

On the other hand, if it is desired to maintain the concentration above a predetermined value, the operator so adjusts the concentration as to maintain the neon lamp 21 dark.

Fig. 11 illustrates a simplified electrode cartridge providing two electrodes 151 and 152 of ring shape and molded in a tube 153 of insulating material to provide a passage or chamber 154 communicating with the fluid. This passage is shown as being of constant diameter but if desired portions of different diameter may be used in conjunction with additional electrodes to provide paths of different lengths and cross-sectional area as disclosed in Fig. 2.

Fig. 12 illustrates an alternative construction of electrode cartridge. Here a tube of insulating material 160 provides opposed pockets 161 receiving electrodes 162 and 163 suitably connected to leads 164 and 165 extending through passages of this tube and surrounded by suitable insulating compound. As the ends of the tube are open, free circulation of the fluid may take place through the chamber defined by the passage of this tube.

In the form shown in Figs. 13 and 14, an electrode-receiving chamber 170 is bounded by a shell 171 and preferably by plugs 172 and 173, these plugs providing openings to permit communication between the chamber 170 and the surrounding fluid at a plurality of points. Two square electrode plates 175 and 176 are positioned in the chamber 170 and are of such size that the diagonal distance between opposed corners is substantially equal to the inner diameter of the shell 171. The electrode plates 175 and 176 are spaced from each other in the chamber 170 by a bar of insulating material 178 to which these electrode plates are secured by any suitable means such as screws 179.

Fig. 15 illustrates a simplified two-passage electrode cartridge formed of molded insulating material to provide a body 180 with a chamber means defined by passages 181 and 182. Ring-shaped electrodes 183 and 184 are molded in place to contact the fluid in these passages. Parallel current paths are indicated by the dotted lines 185 and 186.

In the form of cartridge shown in Fig. 16 two tubes of insulating material 190 and 191 are positioned side by side, being retained in this position by a strap 192. Electrodes 193 and 194 are respectively positioned in the tubes 190 and 191 and are preferably in the form of rings pressed into the passages of these tubes. Detachable plugs 195 and 196 are threadedly or otherwise received by the lower ends of the tubes 190 and 191, these plugs providing passages 197 and 198. Tubes of different lengths for providing passages of different cross-sectional area may be substituted to change the length of the current path or the cross-sectional area of this current path or both. This electrode cartridge may be partially immersed in a liquid to such a depth that the liquid level (such as indicated by the numeral 200) is above the electrodes 193 and 194). The current path between the electrodes is thus indicated by the dotted lines 202 and is readily variable in length and cross-sectional area by inserting different plugs 195 and 196.

It will be clear that the electrode cartridges of my invention can be used by lowering them into any suitable container or by positioning them in a pipe. No large amount of circulation of the fluid is required through the chamber of the cartridge, though it is desirable to have this chamber communicate with the external fluid at a plurality of points so that at least a very minute circulation may take place therethrough to compensate internally for changes in concentration or conductivity taking place externally.

Furthermore, while I have disclosed insulated conductor means extending directly through the fluid to the electrodes, it will be clear that this conductor means may extend upward in a suitable tube means such as is shown in Fig. 16, being thereby protected from contact with the fluid.

Further, while I have mentioned a system for indicating or measuring conductivity or related phenomena, the actual control of this phenomena being effected by the operator after visually noting the indicating means, it will be clear that my system may be used for direct control of conductivity or related phenomena.

The use of an electrode cartridge immersible in the fluid to be tested is an important feature of the present invention, though the use of such a cartridge for mounting the electrodes is not always necessary, certain features of the invention being of utility regardless of this cartridge mount. From the standpoint of changing the current flow between the electrodes, my invention essentially includes a plurality of electrode means together with some means (either electrical or mechanical) for selectively controlling the current delivered to the electrodes. If the change in current is to be brought about electrically without varying the applied potential, it is necessary to use three or more electrodes such, for instance, as a primary set of electrodes and a secondary set of electrodes, it being clear that one electrode may be common to both sets if desired.

Various changes and modifications may be made without departing from the spirit of the invention.

I claim as my invention:

1. A method of measuring the electric conductivity of a fluid, which method includes the steps of: immersing at least three electrodes in the fluid to be tested; successively and during testing of said conductivity sending current between said electrodes through current paths in said fluid of different electrical resistance; and measuring said current.

2. In combination in a device for testing the conductivity of a fluid: tube means formed of insulating material and immersible in said fluid and providing a passage having free access to said fluid at each end; an electrode in said passage and contacting the fluid therein; a second tube means to one side of said first-named tube means and immersible in said fluid and providing a passage having free access to said fluid at each end; a second electrode in said passage of said second tube means; means for conducting current to and from said electrodes whereby said current flows through said fluid in a path extending from one electrode to the other electrode through said passages and through a portion of the fluid outside said passages at adjacent ends of said passages; and indicating means responsive to the current flowing between said electrodes.

3. A combination as defined in claim 2 including means for changing the cross-sectional area of at least one of said passages to change the cross-sectional area of the current path.

4. In combination in a device for testing the conductivity of a fluid; means for selectively flowing current through current paths in said fluid and of different length, said means including at least three electrodes, a potential source and a selector switch selectively connecting various of said electrodes to said potential source;

and indicating means responsive to the amount of current flowing to said electrodes.

5. In combination in a device for testing the conductivity of a fluid: primary electrode means capable of immersion in said fluid and spaced from each other by said fluid a given distance; secondary electrode means capable of immersion in said fluid and spaced from each other by said fluid a second distance dissimilar to said given distance; a potential source; circuit means connected to said primary and secondary electrode means; switch means selectively connecting said potential source to said primary and secondary electrode means through said circuit means; and indicating means responsive to the current flowing through said circuit means and thus responsive to the current flowing to whichever of said electrode means is connected to said potential source by said switch means.

6. In combination in a device for testing the conductivity of a fluid: tube means formed of insulating material and providing a passage openly communicating with said fluid; first and second electrodes retained by said tube means to contact the fluid in said passage whereby maintenance of a potential difference between said first and second electrodes will send current through the fluid bridging these electrodes; a third electrode retained by said tube means to contact said fluid in said passage and spaced from said first and second electrodes; a source of potential; a selector switch selectively connecting said source of potential to said first and second electrodes and to said first and third electrodes; and indicating means responsive to the current flowing to said electrodes.

7. In combination in a device for testing the conductivity of a fluid: a plurality of electrodes capable of immersion in said fluid; a potential source; means including a selector switch for selectively connecting certain of said electrodes to said potential source to form electrically parallel current paths through said fluid when in a first position and when in a second position connecting certain of said electrodes to said potential source to form a single current path through said fluid; and indicating means responsive to the current flowing to said electrodes.

8. In combination in a device for testing the conductivity of a fluid: means for selectively flowing current through current paths of different cross-sectional area in said fluid, said means including a plurality of electrodes, a baffle means guiding the current through paths of different cross-sectional area and a potential source supplying current to said electrodes; and indicating means responsive to the current flowing to said electrodes.

9. In combination in a device for testing the conductivity of a fluid: a set of primary electrodes capable of immersion in said fluid and spaced from each other by said fluid a given distance; a set of secondary electrodes capable of immersion in said fluid and spaced from each other by said fluid a distance dissimilar to said given distance; a multi-potential source; switch means selectively impressing across said primary and secondary sets of electrodes different potentials from said source to vary the potential difference sending current through paths of different length in said fluid; and an indicating means responsive to the current flowing to said sets of electrodes.

10. In combination in an electrode cartridge: a submersible shell providing a chamber and openings permitting free access to said chamber of the liquid in which said shell is submerged; a plurality of electrodes in said shell and contacting the liquid in said chamber; and baffle means separating said electrodes to lengthen the current path between said electrodes in said chamber.

11. In combination in a device for measuring the conductivity of a fluid: a shell immersible in said fluid; a baffle means in said shell and bounding two passages in said shell communicating with and containing a portion of said fluid; electrodes on opposite sides of said baffle means and intermediate the ends thereof to respectively contact the fluid in said passages; a source of potential connected to said electrodes for sending current through said fluid from one electrode along one passage around the end of said baffle means and thence along the other passage to the other electrode to form a relatively long path through which the current moves; and means responsive to the amount of current thus flowing through said relatively long path.

12. In combination in a device for testing the conductivity of a fluid: a shell providing a chamber; a pair of parallel tubes in said chamber and providing passages openly communicating with and containing a portion of said fluid; electrode means in said passages; means for impressing a potential difference between said electrode means to send a current from one electrode means along the passage in which it is positioned and through the fluid exterior of said passages and to the other electrode through the fluid in the other of said passages; and indicating means responsive to the current flowing to said electrode means.

13. In combination in a device for testing the conductivity of a fluid: a cartridge immersible in said fluid and providing a passage and containing a portion of said fluid; an electrode in said passage and contacting the fluid therein; a plug associated with said cartridge and providing an opening through which said passage openly communicates with said fluid in which said cartridge is immersible; another electrode in said cartridge spaced from said first-named electrode and contacting said fluid, said plug being positioned electrically between said electrodes; means for impressing a potential difference between said electrodes to send current through a path from one electrode to another through fluid in said passage and in said opening of said plug; and indicating means responsive to the current flowing in said path.

14. In combination in a device for testing the conductivity of a fluid: a cartridge immersible in said fluid and providing a passage means; two plugs in the ends of said passage means and providing openings smaller in cross-section than said passage means and through which said passage means communicates with different portions of said fluid; an electrode in said passage means between said plugs; means sending current through said fluid and to said electrode, said means including a potential source and another electrode in said cartridge spaced from said first-named electrode by a portion of said fluid; and indicating means operative in response to said current.

15. In combination in a device for testing the conductivity of a fluid: a cartridge immersible in said fluid and providing walls defining a passage communicating at its ends with said fluid; an electrode set into said walls at an intermediate section of said passage, said electrode providing an opening substantially corresponding in shape and size to the cross-sectional shape and size of said passage whereby said electrode surrounds a portion of said passage and forms a continuation thereof; means including another electrode in said cartridge and a potential source for sending current through the fluid bridging said electrodes; and indicating means responsive to changes in said current.

16. In combination in a device for testing the conductivity of a fluid: an insulating housing adapted for immersion in the fluid to be tested and defining a pair of passages open at each end for access to said fluid; a plurality of electrodes exposed within said passages; a potential source sending current between selected electrodes and through said fluid, said electrodes being so disposed that the potential drop from electrodes of one polarity to a point in said fluid intermediate two adjacent ends of said passages is substantially equal to the potential drop from the same electrodes to a point in said fluid intermediate the opposite ends of said passages whereby no current will flow externally from one end of said housing to the other; and indicating means responsive to the current flowing between said electrodes.

17. In combination in a device for testing the conductivity of a fluid: a cartridge comprising a plurality of insulating tubes having access to the fluid to be tested, at least one electrode in each tube exposed to contact the fluid therein; conductor means connected to said electrodes and extending to a position spaced from said fluid, said cartridge having a portion extending above the surface of said fluid and surrounding said conductor means; a potential source; means for sending current from said source through said conductor means to selected electrodes; and indicating means responsive to the current flowing through said fluid between said selected electrodes.

18. In combination in a fluid conductivity testing cartridge: an insulating housing adapted for immersion in the fluid to be tested and providing walls forming a restricted opening, and forming an interior chamber of large cross-sectional area relative to the cross-sectional area of said opening, said interior chamber communicating with the exterior liquid through said restricted opening, the internal walls in said chamber which surround the internal liquid being made partly of electrical conducting material to form an electrode providing a relatively large internally exposed effective contact surface; and a second electrode positioned externally of said restricted opening.

19. In combination in a fluid conductivity testing cartridge: an insulating housing defining an interior passage; a first electrode enclosed within said housing and exposed only to said interior passage, said housing being adapted for immersion in the fluid to be tested to bring said first electrode below the level of the fluid exterior of said passage to allow said fluid to enter said interior passage to contact said first electrode therein, said insulating housing preventing contact of said first electrode with exterior fluid, and said first electrode forming part of the side wall which surrounds and defines the cross-section of the interior fluid path; and a second electrode positioned for causing current flowing between said electrodes to flow internally along said passage, the electric current passing through said interior passage being outwardly diverged substantially radially into the contact surface of said first electrode.

20. In combination in a fluid conductivity testing cartridge, an electrode structure comprising: a tubular electrode open for access of said fluid to its interior when immersed or partly immersed therein; a second electrode within said tubular electrode; insulating members spacing and mutually supporting said electrodes and defining longitudinal passages allowing a uni-directional, longitudinal flow of fluid through said tubular electrode and between said insulating members, and thus allowing free circulation of fluid and reducing the formation of air pockets in current carrying areas and adjacent areas below the level of said fluid; and mutually insulated conductors extending from said electrodes to the exterior of said fluid.

21. In a device for testing the conductivity of a fluid: an insulating housing defining an interior passage open at each end for free access of said fluid to said interior passage; a first electrode enclosed within said housing and exposed only to said interior passage, said housing being adapted for immersion in the body of fluid to be tested to bring said first electrode below the level of the fluid exterior of said passage and allowing said fluid to enter said interior passage and to contact said first electrode therein, and said insulating housing preventing contact of said first electrode with fluid exterior of said housing: a second electrode disposed externally of said passage; a potential source; and means for sending current through said fluid between said electrodes.

22. In combination in a fluid conductivity testing cartridge: a tube formed of insulating material open for access of said fluid to its interior; an electrode in said tube providing an opening substantially corresponding in shape and size to the cross-sectional shape and size of the supporting insulating tube, whereby said electrode surrounds part of the fluid path and thereby contacts said fluid, the interior surface of said electrode being substantially flush with the internal surface of said insulating tube; and a second electrode positioned for causing current flowing between said electrodes to flow internally along said tube.

SOREN L. CHRISTIE.